US010742900B2

(12) United States Patent
Kim et al.

(10) Patent No.: US 10,742,900 B2
(45) Date of Patent: Aug. 11, 2020

(54) METHOD AND SYSTEM FOR PROVIDING CAMERA EFFECT

(71) Applicant: NAVER Corporation, Seongnam-si (KR)

(72) Inventors: Hyun-Soo Kim, Seongnam-si (KR); Jiyoung Park, Seongnam-si (KR); Kyung Eun Lee, Seongnam-si (KR); Young Ok Choi, Seongnam-si (KR); Eun Sol Kim, Seongnam-si (KR); SungHo Kim, Seongnam-si (KR); Sungtak Cho, Seongnam-si (KR); Jeong Myeong Kim, Seongnam-si (KR); Kisu Park, Seongnam-si (KR); Yoosub Song, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 16/163,332

(22) Filed: Oct. 17, 2018

(65) Prior Publication Data

US 2019/0116323 A1 Apr. 18, 2019

(30) Foreign Application Priority Data

Oct. 18, 2017 (KR) ........................ 10-2017-0135369

(51) Int. Cl.
*H04N 5/272* (2006.01)
*H04N 5/262* (2006.01)
(Continued)

(52) U.S. Cl.
CPC ......... *H04N 5/272* (2013.01); *G06K 9/00302* (2013.01); *H04N 5/2621* (2013.01);
(Continued)

(58) Field of Classification Search
CPC ............... H04N 5/272; H04N 21/4312; H04N 21/44222; H04N 5/2621; H04N 9/00302;
(Continued)

(56) References Cited

U.S. PATENT DOCUMENTS

2015/0381938 A1* 12/2015 Cunico .................. H04N 7/157
348/14.1
2018/0160055 A1* 6/2018 Taine ..................... H04N 5/272

FOREIGN PATENT DOCUMENTS

JP 2005079882 A 3/2005
JP 2010066844 A 3/2010
(Continued)

OTHER PUBLICATIONS

Japanese Office Action dated Oct. 8, 2019 by the Japanese Patent Office corresponding to Japanese patent application No. 2018-196434.

*Primary Examiner* — Ahmed A Berhan
(74) *Attorney, Agent, or Firm* — Greer, Burns & Crain, Ltd.

(57) ABSTRACT

Disclosed is a method and system for providing a camera effect. An effect providing method of an electronic device configured as a computer includes determining an emotion for a camera image of the electronic device as a criterion for selecting an effect to be applied to the camera image of the electronic device; and immediately applying, to the camera image, an effect that is randomly selected from among effects representing the determined emotion.

19 Claims, 10 Drawing Sheets

(51) Int. Cl.
    *G06K 9/00*      (2006.01)
    *G06F 3/0481*    (2013.01)
    *G06F 3/0482*    (2013.01)
    *G06T 11/60*     (2006.01)
    *H04N 21/442*    (2011.01)
    *H04N 21/431*    (2011.01)
    *G06F 3/0484*    (2013.01)
    *H04N 21/414*    (2011.01)
    *H04N 21/2747*   (2011.01)
    *H04N 21/258*    (2011.01)

(52) U.S. Cl.
    CPC ........ *G06F 3/0482* (2013.01); *G06F 3/04817* (2013.01); *H04N 2005/2726* (2013.01)

(58) Field of Classification Search
    CPC ......... H04N 21/44218; G06K 9/00248; G06K 9/00302
    See application file for complete search history.

(56) References Cited

FOREIGN PATENT DOCUMENTS

| | | |
|---|---|---|
| KR | 20030029556 A | 4/2003 |
| KR | 20060022494 A | 10/2006 |
| KR | 20100062207 A | 6/2010 |
| KR | 1020110030223 A | 3/2011 |

\* cited by examiner

600

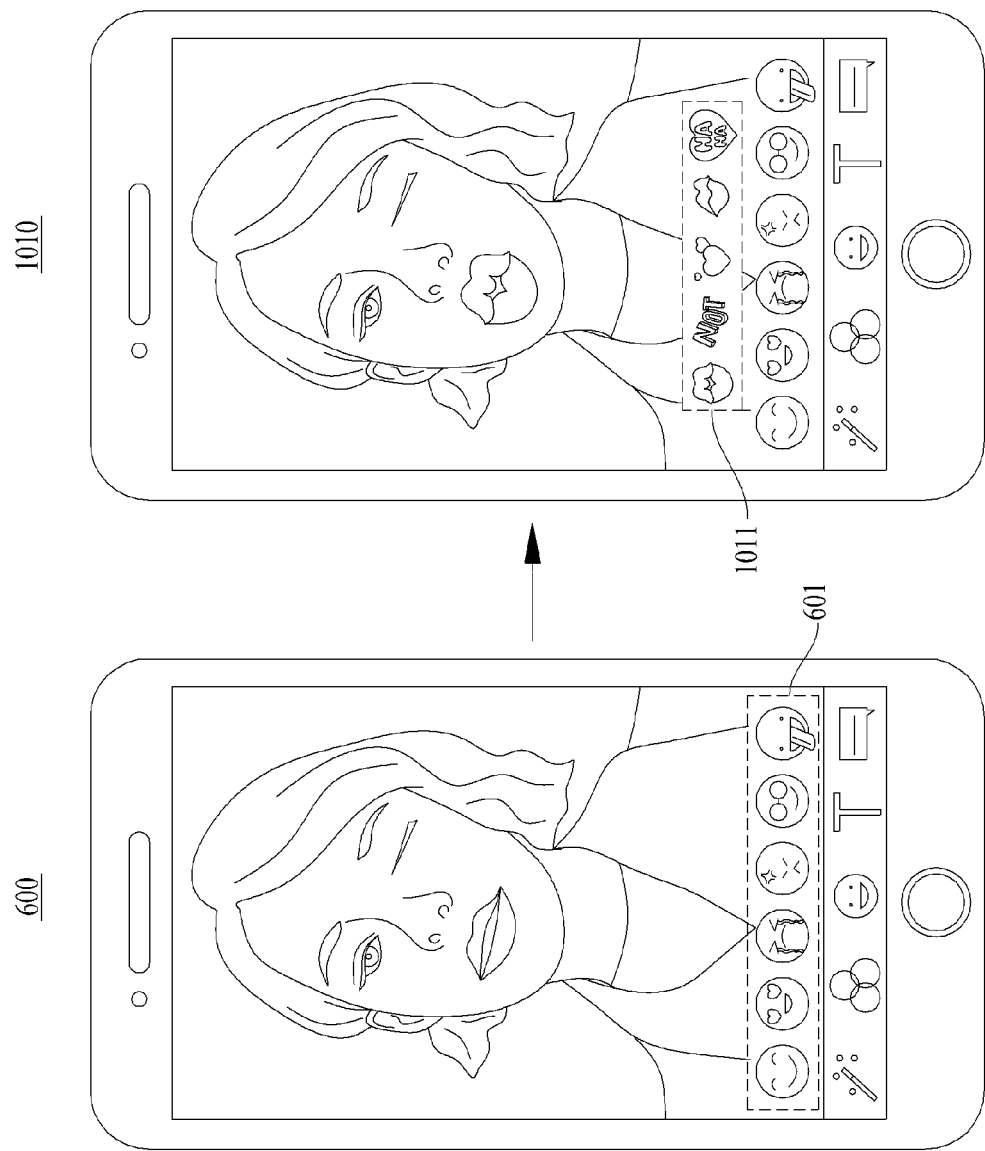

METHOD AND SYSTEM FOR PROVIDING CAMERA EFFECT

CROSS-REFERENCE TO RELATED APPLICATION(S)

This application claims priority under 35 U.S.C. § 119 to Korean Patent Application No. 10-2017-0135369 filed on Oct. 18, 2017, in the Korean Intellectual Property Office (KIPO, the entire contents of which are incorporated herein by reference.

BACKGROUND

Field

One or more example embodiments relate to technology for providing an augmented reality (AR) camera effect.

Description of Related Art

Currently, mobile data communication services using personal information terminals, for example, smartphones, tablets, and wearable devices, are widely used.

A field of radio broadcasting service that provides various types of contents to a personal information terminal may be one of the most popular fields among the mobile data communication services.

For example, Korean Patent Laid-Open Publication No. 10-2003-0029556, published on Apr. 14, 2003, discloses technology for providing photo-shooting information acquired from a mobile terminal through Internet broadcasting, wireless broadcasting, or airwave broadcasting.

SUMMARY

One or more example embodiments provide a method and system that may quickly provide a camera effect without interrupting a broadcast under a live broadcast.

One or more example embodiments also provide a method and system that may provide a camera effect suitable for an emotion selected by a user or an emotion automatically recognized from an image during a live broadcast.

According to an aspect of at least one example embodiment, there is provided an effect providing method of an electronic device configured as a computer, the method including determining an emotion for a camera image (i.e., a still or moving image taken by the camera of the electronic device or provided to the electronic device) of the electronic device as a criterion for selecting an effect to be applied to the camera image of the electronic device; and immediately applying, to the camera image, an effect that is randomly selected from among effects representing the determined emotion.

The determining may include determining an emotion selected by a user of the electronic device as an effect selection criterion.

The determining may include determining an emotion recognized from a facial expression of the camera image as an effect selection criterion.

The effect providing method may further include collecting contextual information associated with a user of the electronic device. The applying may include randomly selecting the effect from among the emotions corresponding to the determined emotion, the effect matching the contextual information.

The collecting may include collecting the contextual information including at least one of time information associated with the camera image, place information associated with the camera image, color information associated with the camera image, shooting mode information associated with the camera image, history information about an effect used by the user, feedback information associated with the camera image, target information associated with the camera image, and facial expression information recognized from the camera image.

The selecting may include applying a weight corresponding to the contextual information to each of the effects corresponding to the determined emotion and selecting the effect to be applied to the camera image based on the weight.

The selecting may include selecting different contextual information based on the determined emotion and using the selected contextual information as the effect selection criterion.

The selecting may include applying a weight corresponding to the contextual information to each of the effects corresponding to the determined emotion and selecting the effect to be applied to the camera image based on the weight, and applying a different weight for each piece of the contextual information based on the determined emotion.

The determining may include providing an emotion selection menu including a plurality of emotion icons; and determining an emotion selected through the emotion selection menu as an effect selection criterion.

The applying may include selecting a different effect selection target to be applied to the camera image from among the effects corresponding to the determined emotion, based on a user gesture type for the emotion selection menu.

According to an aspect of at least one example embodiment, there is provided a non-transitory computer-readable recording medium storing instructions that, when executed by a processor, cause the processor to perform the effect providing method.

According to an aspect of at least one example embodiment, there is provided an effect providing system of an electronic device configured as a computer, the effect providing system including one or more processors configured to execute computer-readable instructions. The one or more processors include an emotion determiner configured to determine an emotion for a camera image of the electronic device as a criterion for selecting an effect to be applied to the camera image of the electronic device; and an effect selector configured to immediately apply, to the camera image, an effect that is randomly selected from among effects representing the determined emotion.

According to some example embodiments, it is possible to quickly provide a camera effect without interrupting a broadcast during a live broadcast, and to provide a camera effect suitable for an emotion selected by a user or an emotion automatically recognized from an image during a live broadcast.

Also, according to some example embodiments, since a camera effect suitable for an emotion selected by a user or an emotion automatically recognized from an image is provided through a user context-based weight modeling, it is possible to provide an effect capable of further optimally representing a corresponding emotion.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein:

FIGS. 6 through 10 illustrate examples of a process of providing an effect corresponding to an emotion according to at least one example embodiment.

Figure 1:
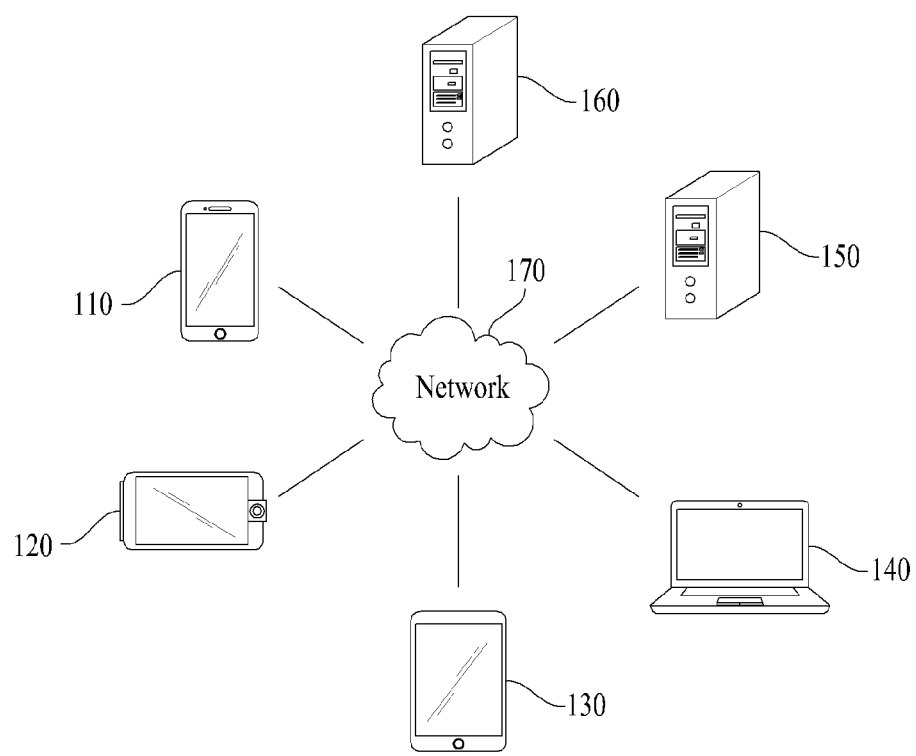
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or non-transitory computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism) capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing a camera effect, and more particularly, to a method and system that may quickly provide a camera effect suitable for an emotion under a live broadcast.

The example embodiments disclosed herein may quickly provide a camera effect while shooting a video or during a live broadcast and accordingly, may achieve many advantages in terms of rapidness, efficiency, variety, and fun.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and/or 140 may be a fixed terminal or a mobile terminal configured as a computer device. For example, the plurality of electronic devices 110, 120, 130, and/or 140 may be a smartphone, a mobile phone, tablet personal computer (PC), a navigation, a computer, a laptop computer, a digital broadcasting terminal, a personal digital assistant (PDA), a portable multimedia player (PMP), and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 160 may provide a file for installing an application to the electronic device 110 connected over the network 170. In this case, the electronic device 110 may install the application using the file provided from the server 160. Also, the electronic device 110 may connect to the server 150 under control of at least one program, for example, browser or the installed application, or an operating system (OS) included in the electronic device 110, and may receive a service or content provided from the server 150. For example, when the electronic device 110 transmits a service request message to the server 150 through the network 170 under control of the application, the server 150 may transmit a code corresponding to the service request message to the electronic device 110 and the electronic device 110 may provide the content to the user by configuring and displaying a screenshot corresponding to the code under control of the application.

Figure 2:
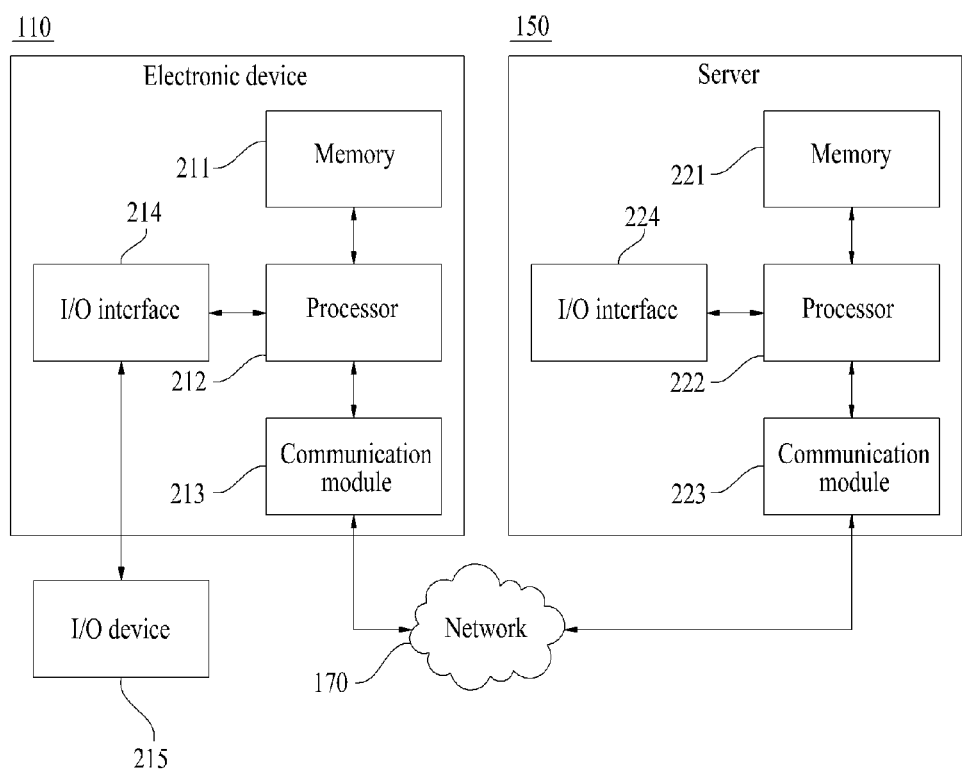
FIG. 2 is a block diagram illustrating a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, a flash memory, etc., as a non-transitory computer-readable storage medium. Also, an OS or at least one program code, for example, a code for an application installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request, such as a search request, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, and can be further included in the electronic device 110.

The I/O interface 214 may be a device used for interface with an I/O device 215. For example, an input device may include a device, such as a keyboard, a mouse, etc., and an output device may include a device, such as a display, for displaying a communication session of an application. As another example, the I/O interface 214 may be a device for interface with an apparatus in which an input function and an output function are integrated into a single function, such as a touchscreen. In detail, when processing instructions of the computer program are loaded to the memory 211, the processor 212 of the electronic device 110 may display a service screenshot configured using data provided from the server 150 or the electronic device 120, or may display content on a display through the I/O interface 214. Likewise, when processing instructions of the computer program loaded to the memory 221, the processor 222 of the server 150 may output information configured using data provided from the server 150 through the I/O interface 224.

According to other example embodiments, the electronic device 110 and the server 150 may include a greater or lesser number of components than the number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibrator for vibration, etc., which are generally included in the smartphone. However, there is no need to clearly illustrate many components according to the related art.

Figure 3:
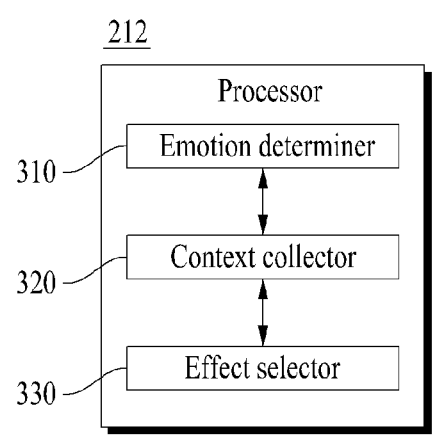
FIG. 3 is a diagram illustrating an example of a component included in a processor of an electronic device according to at least one example embodiment.
Figure 4:
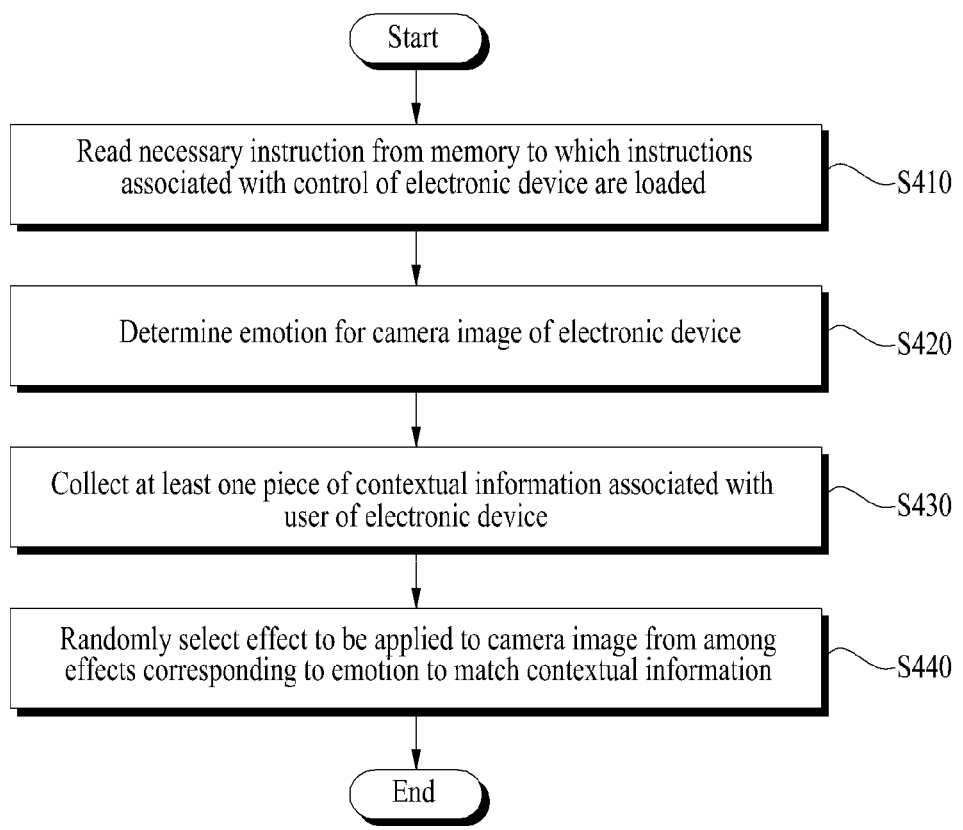
FIG. 4 is a flowchart illustrating an example of an effect providing method performed by an electronic device according to at least one example embodiment.

FIG. 3 is a diagram illustrating an example of a component that can be included in a processor of an electronic device according to at least one example embodiment, and FIG. 4 is a flowchart illustrating an example of an effect providing method performed by an electronic device according to at least one example embodiment.

An effect providing system configured as a computer may be provided in the electronic device 110 according to an example embodiment. The effect providing system may be configured as a PC-based program or as an application exclusive for a mobile terminal. The effect providing system may be configured in a form of a program that independently operates or may be configured in an in-app form of a specific application, for example, a camera function, to be operable on the specific application. The effect providing system may be configured in a form of an application installed on the electronic device 110 and configured to immediately apply a random effect suitable for an emotion to a camera during a live broadcast in conjunction with the server 150.

For example, in response to an instruction provided from the application installed on the electronic device 110, the effect providing system configured in the electronic device 110 may perform an effect providing method. Referring to FIG. 3, to perform the effect providing method of FIG. 4, the processor 212 of the electronic device 110 may include an emotion determiner 310, a context collector 320, and an effect selector 330 as components. Depending on example embodiments, the components of the processor 212 may be included in or excluded from the processor 212. Also, the components of the processor 212 may be separate or merged for functional representation of the processor 212.

The processor 212 and the components of the processor 212 may control the electronic device 110 to perform operations S410 through S440 included in the effect providing method of FIG. 4. For example, the processor 212 and the components of the processor 212 may be configured to execute an instruction according to a code of at least one program and a code of the OS included in the memory 211.

Here, the components of the processor 212 may be representations of different functions of the processor 212 performed by the processor 212 in response to an instruction (for example, an instruction provided from the application executed on the electronic device 110) provided from the program code stored in the electronic device 110. For example, the emotion determiner 310 may be considered as a functional representation of the processor 212 that controls the electronic device 110 to determine an emotion corresponding to a camera image in response to the instruction.

Referring to FIG. 4, in operation S410, the processor 212 may read a necessary instruction from the memory 211 to which instructions associated with control of the electronic device 110 are loaded. In this case, the read instruction may include an instruction for controlling the processor 212 to perform the following operations S420 through S440.

The example embodiments relate to synthesizing a camera image with a predetermined (or, alternatively, desired) effect as an augmented reality (AR) image and thereby, providing a single image in a streaming environment in which an image captured with a camera of the electronic device 110, such as a live broadcast or voice over Internet protocol (VoIP), is transmitted in real time through an Internet communication line. In particular, the example embodiments relate to automatically selecting and quickly providing an effect based on an environment in which a camera image is transmitted in real time, instead of directly designating an effect to be applied to the camera image. Also, the example embodiments relate to automatically selecting and providing an effect to be applied to a camera image based on a video shooting environment as well as the live streaming environment.

In operation S420, the emotion determiner 310 may determine an emotion for a camera image of the electronic device 110 as a criterion for selecting an effect to be applied to the camera image of the electronic device 110. The term "effect" used herein may inclusively indicate a filter, a sticker, an emogi, and the like to be synthesized with the camera image as content including image content, and may be configured as a stationary object or as a moving image object to which a flash or an animation is applied. The effect may represent emotion information and may be classified in advance for each emotion. That is, a plurality of emotions, for example, six emotions including joy, love, sorrow, angry, cool, and crazy, may be predefined and effects representing a corresponding emotion may be grouped and managed for each emotion. For example, the emotion determiner 310 may select a single specific emotion from among the plurality of emotions predefined by the user. As another example, the emotion determiner 310 may determine an emotion corresponding to the camera image by extracting emotion information from a facial expression based on the camera image. The facial expression may appear due to contraction of facial muscles occurring in response to a deformation in facial elements, such as eyebrows, eyes, a nose, lips, and skin. Intensity of facial expression may be determined based on a geometrical change in facial features or density of muscle expression. For example, the emotion determiner 310 may extract a feature point from a region of interest (ROI), for example, an eye area, an eyebrow area, a nose area, and a lip area, to extract a feature according to a facial expression and may determine a constant feature value based on the extracted feature point. The feature value corresponds to a specific numerical value representing the facial expression of a person based on a distance between feature points. The emotion determiner 310 determines a constant intensity value based on numerical values of feature values shown in an image to apply the determined feature value to an emotional response model, and determines an intensity value that matches a numerical value of each feature value by referring to a mapping table. The mapping table is provided, and preferably stored, in advance based on the emotional response model (i.e., the mapping table is preferably a pre-determined table). The emotion determiner 310 may map the emotional response model and the intensity value and may extract a type and intensity of the determined emotion based on a result of applying the corresponding intensity value to the emotional response model. The aforementioned technique of extracting emotion information is provided as an example only and may use other known techniques.

Accordingly, the emotion determiner 310 may determine an emotion selected by the user or an emotion automatically recognized from the image as a criterion for selecting the effect to be applied to the camera image.

In operation S430, the context collector 320 may collect at least one piece of contextual information associated with the user of the electronic device 110. That is, the context collector 320 may collect contextual information associated with the user based on an additional criterion for selecting an effect to be applied to the camera image. For example, the context collector 320 may collect time information associated with the camera image and may include time information including a date and a time at which the camera image was acquired by the electronic device 110 at a video shooting point in time. As another example, the context collector 330 may collect place information associated with the camera image and may collect, for example, location information, such as GPS coordinates, from the electronic device 110 at a video shooting point in time. As another example, the context collector 330 may collect color information associated with the camera image and may collect the color information by analyzing a color value included in a camera screenshot or by recognizing a skin tone of a face in the camera image and a color of a camera illumination at the video shooting point in time. As another example, the context collector 330 may collect shooting mode information associated with the camera image, and may collect mode information about a mode in which a video was captured, for example, a front camera shooting mode/rear camera shooting mode or a person (portrait) shooting mode/background shooting mode. As another example, the context collector 330 may collect history information about an effect used by the user of the electronic device 110 and may collect information about an effect generally used by the user in the past or an effect similar thereto. As another example, the context collector 330 may collect feedback information of a viewer on the camera image and may collect context, such as conversations exchanged between the user and the viewer and comments or reactions registered by the viewer. As another example, the context collector 330 may collect target information associated with the camera image and may collect information about a corresponding community such as a subject or a category of the community, for example, when the user desires to select a specific community and provide the camera image to the selected specific community. As another example, the context collector 330 may collect facial expression information including intensity of an emotion in the camera image and may include a type of the emotion and intensity of the emotion from a facial expression included in the camera image. An effect capable of verifying a type of an emotion and intensity of the emotion may be used to verify an actual facial expression in an image and may be used as an effect selection criterion.

Accordingly, the context collector 320 may collect contextual information of the user, that is, at least one of time information, place information, color information, shooting mode information, history information, feedback information, target information, and facial expression information as an additional criterion for selecting the effect to be applied to the camera image.

In operation S440, the effect selector 330 may randomly select the effect to be applied to the camera image from among a plurality of effects classified into the emotion determined in operation S420. For example, in response to the user selecting 'joy' from among predefined emotions (such as the six emotions mentioned earlier: 'joy', 'love', 'sorrow', 'angry', 'cool', and 'crazy', the effect selector 330 may randomly select a specific effect from an effect group corresponding to 'joy' and may immediately apply the selected specific effect to the camera image. Accordingly, the effect selector 330 may randomly select an effect of an emotion based on an emotion selected by the user and may immediately provide the effect to an image that is transmitted in real time.

Figure 5:
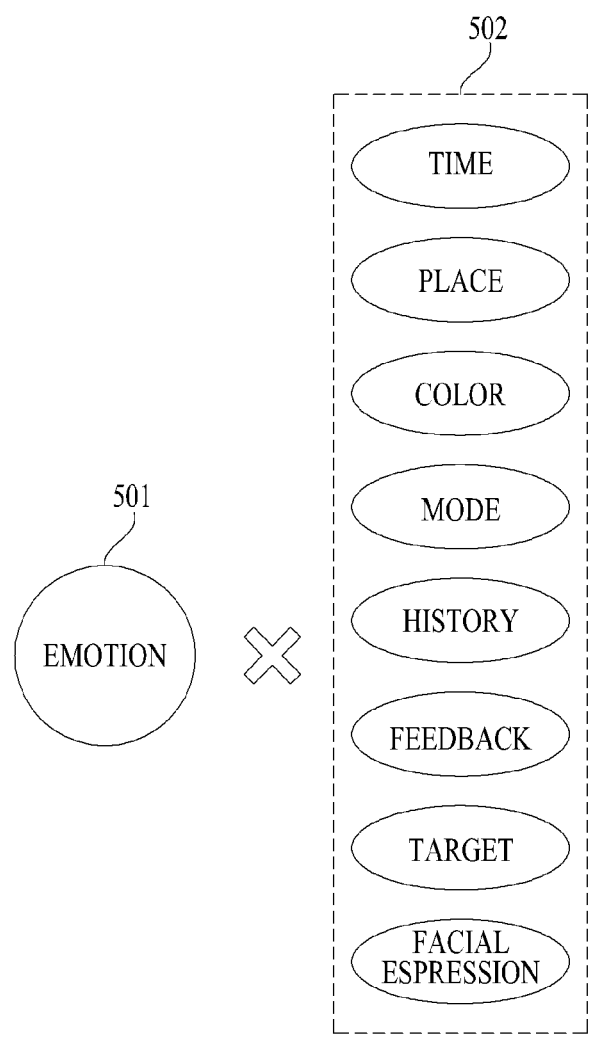
FIG. 5 illustrates an example of contextual information used as an effect selection criterion according to at least one example embodiment.

Further, the effect selector 330 may randomly select the effect to be applied to the camera image from among the effects corresponding to the emotion determined in operation S420. Here, the effect selector 330 may select the effect that matches the contextual information collected in operation S430. The random effect may be selected through weight modeling according to the contextual information including at least one of time information, place information, color information, shooting mode information, history information, feedback information, target information and facial expression information. Referring to FIG. 5, the effect selector 330 may use an emotion 501 selected by the user or automatically recognized in an image as a criterion for selecting an effect. Here, the effect selector 330 may use, as an additional selection criterion, user context-based contextual information 502 including at least one of time information, place information, color information, shooting mode information, history information, feedback information, target information and facial expression information. Each effect may include metadata, various types of tags, and information about a design element as attribute information associated with a corresponding effect. Accordingly, the effect selector 330 may assign a weight for each context to an effect by comparing contextual information and attribute information and may provide an effect having highest scores based on the weight or may provide an effect randomly selected from among effects of which scores calculated based on the weight are greater than or equal to a predetermined (or, alternatively desired) level.

As an example of a method of assigning a weight for each context, the effect selector 330 may use all of the contextual information 502 as the additional selection criterion regardless of the emotion 501 and may assign the same weight to each piece of the contextual information 502. As another example, the effect selector 330 may select and use a different piece information in the contextual information 502 corresponding to the additional selection criterion based on the emotion 501. For example, the effect selector 330 may use the time information and the place information in the contextual information 502 as the additional selection criterion if the emotion 501 is 'joy' and may use the place information in the contextual information 502 as the additional selection criterion if the emotion 501 is 'sorrow'. As another example, the effect selector 330 may assign a different weight for each piece information in the contextual information 502 based on the emotion 501. For example, the effect selector 330 may assign a relatively high weight to the time information and the place information in the contextual information 502 if the emotion 501 is 'joy' and may assign a relatively high weight to the place information in the contextual information 502 if the emotion 501 is 'sorrow'.

When the time information is selected as the additional selection criterion from the contextual information 502, the weight selector 330 may assign a weight to an effect specialized for a photo-shooting date or a photo-shooting timeline of the user. For example, the weight selector 330 may select an effect specialized for a specific time, such as, Christmas, Valentine's day, other holiday, a late nighttime, etc.

When the place information is selected as the additional selection criterion from the contextual information 502, the weight selector 330 may recognize a specific place from a photo-shooting location of the user or the camera image and may assign a weight to an effect specialized for the recognized specific place. For example, the weight selector 330 may select an effect specialized for a specific place, such as Eiffel tower, Namsan mountain, Myeongdong, etc.

When the color information is selected as the additional selection criterion from the contextual information 502, the weight selector 330 may analyze a color value included in a camera screenshot or may recognize a skin tone of a person, an illumination color, etc., in the camera image, and may assign a weight to an effect suitable for a corresponding color. For example, if a background color in the camera image is overall very bright, the weight selector 330 may select a camera effect of a contrast color while avoiding a similar color.

When the photo-shooting mode information is selected as the additional selection criterion from the contextual information 502, the weight selector 330 may recognize a photo-shooting mode, such as a front camera shooting mode/rear camera shooting mode or a person (portrait) shooting mode/background shooting mode, and may assign a weight to an effect suitable for the recognized photo-shooting mode. For example, the weight selector 330 may select an effect based on a mask in a selfie mode using a front camera, may select a camera effect applicable to various persons, such as a face swiping effect, in the case of photographing a plurality of persons, and may select an effect specialized for a background in a background shooting mode using a rear camera.

When the history information is selected as the additional selection criterion from the contextual information 502, the weight selector 330 may assign a weight to an effect frequently used by the user or a similar effect. For example, the weight selector 330 may select an effect most recently used by the user or an effect frequently used by the user during a preset recent period of time.

When the feedback information is selected as the additional selection criterion from the contextual information 502, the weight selector 330 may analyze context, such as conversations exchanged between the user and the viewer or reactions of viewers and may assign a weight to an effect that matches the corresponding content. For example, the weight selector 330 may select an effect suitable for a subject of conversations exchanged between the user and the viewer.

When the target information is selected as the additional selection criterion from the contextual information 502, the weight selector 330 may assign a weight to an effect suitable for a characteristic of a target to which the user desires to provide the camera image. For example, the weight selector 330 may select a camera effect associated with scuba diving in the case of providing a live broadcast to a scuba fellow community group, and may select a camera effect associated with animals in the case of providing a live broadcast to a dog community group.

When the facial expression information is selected as the additional selection criterion from the contextual information 502, the weight selector 330 may assign a weight to an effect suitable for a facial expression in an image. For example, if a person in the image smiles, the weight selector 330 may select an effect specialized for a smiling expression. As another example, the weight selector 330 may analyze the intensity of an emotion in a facial expression in the image and may select an effect specialized for the analyzed intensity of emotion. If the user selects 'joy' and the intensity of emotion of a rating of '3' is recognized in the image, the weight selector 330 may select an effect suitable for the intensity of emotion of a rating of '3' from among the effects included in the group associated with 'joy'.

FIGS. 6 through 10 illustrate examples of a process of providing an effect corresponding to an emotion according to at least one example embodiment.

Figure 6:
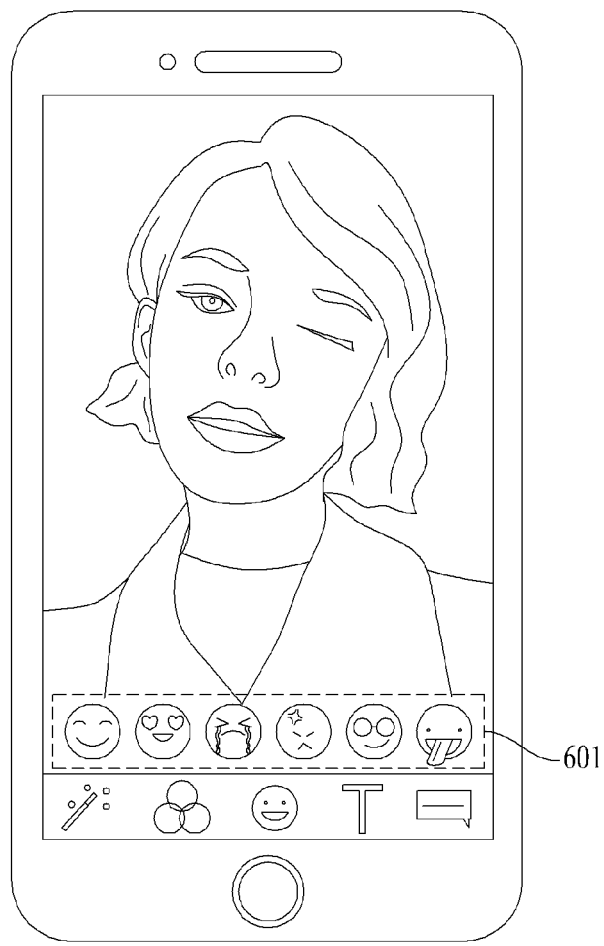

FIG. 6 illustrates an example of a camera image screen 600 provided as a live broadcast. Referring to FIG. 6, an emotion selection menu 601 for selecting an effect group classified using a plurality of emotions may be displayed on the camera image screen 600. For example, the effect group may be classified into six emotions, that is, joy, love, sorrow, angry, cool, and crazy (as shown from left to right in FIG. 6). The emotion selection menu 601 including the six emotion icons may be displayed on the camera image screen 600 so that the user may select an emotion as an effect selection criterion.

Figure 7:
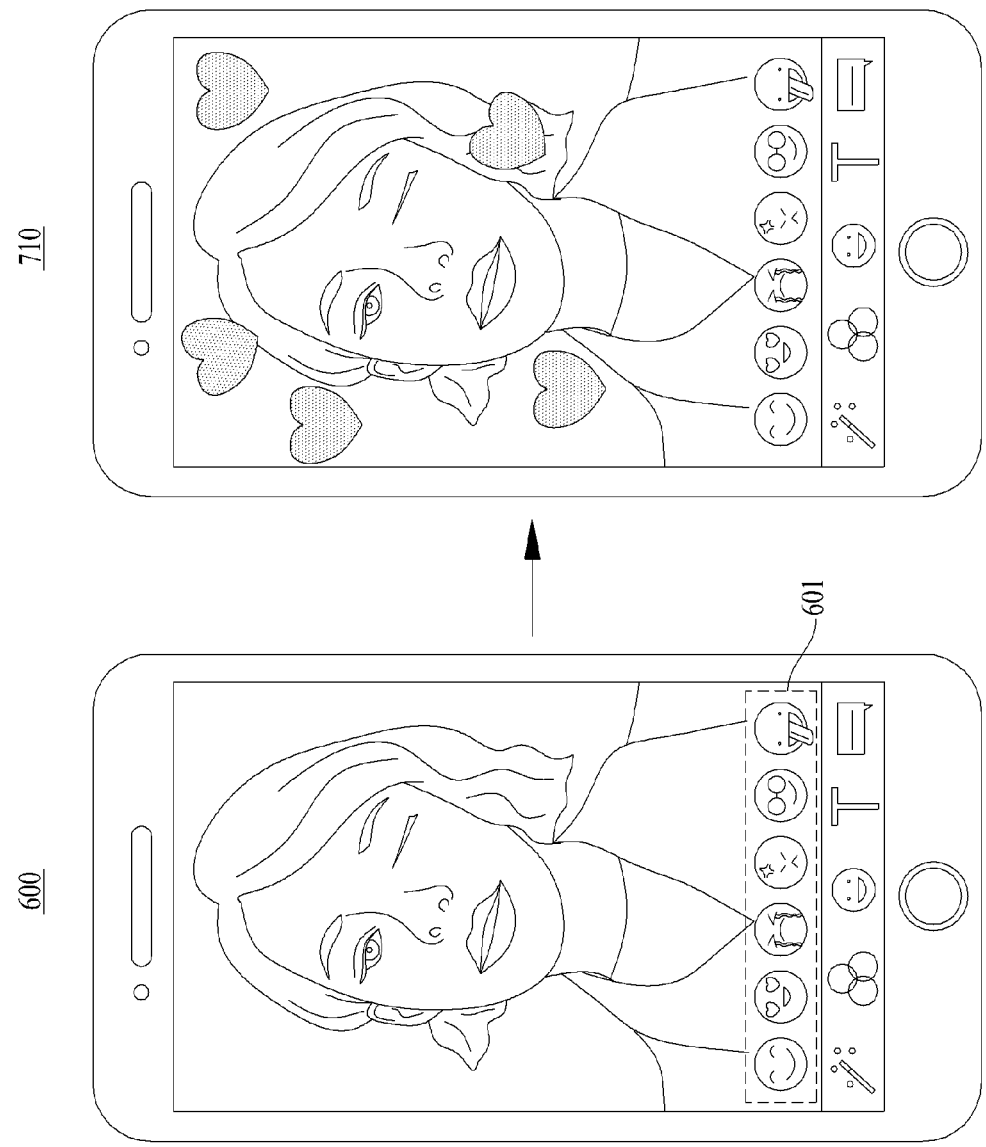

Referring to FIG. 7, in response to the user selecting the icon 'joy' from the emotion selection menu 601 on the camera image screen 600, a random effect may be selected from among effects corresponding to a group of 'joy,' and the selected effect is immediately applied to the image from the camera. Accordingly, an effect suitable for the emotion 'joy', for example, an image 710 to which a heart-shaped effect is applied, may be provided as the live broadcast.

Figure 8:
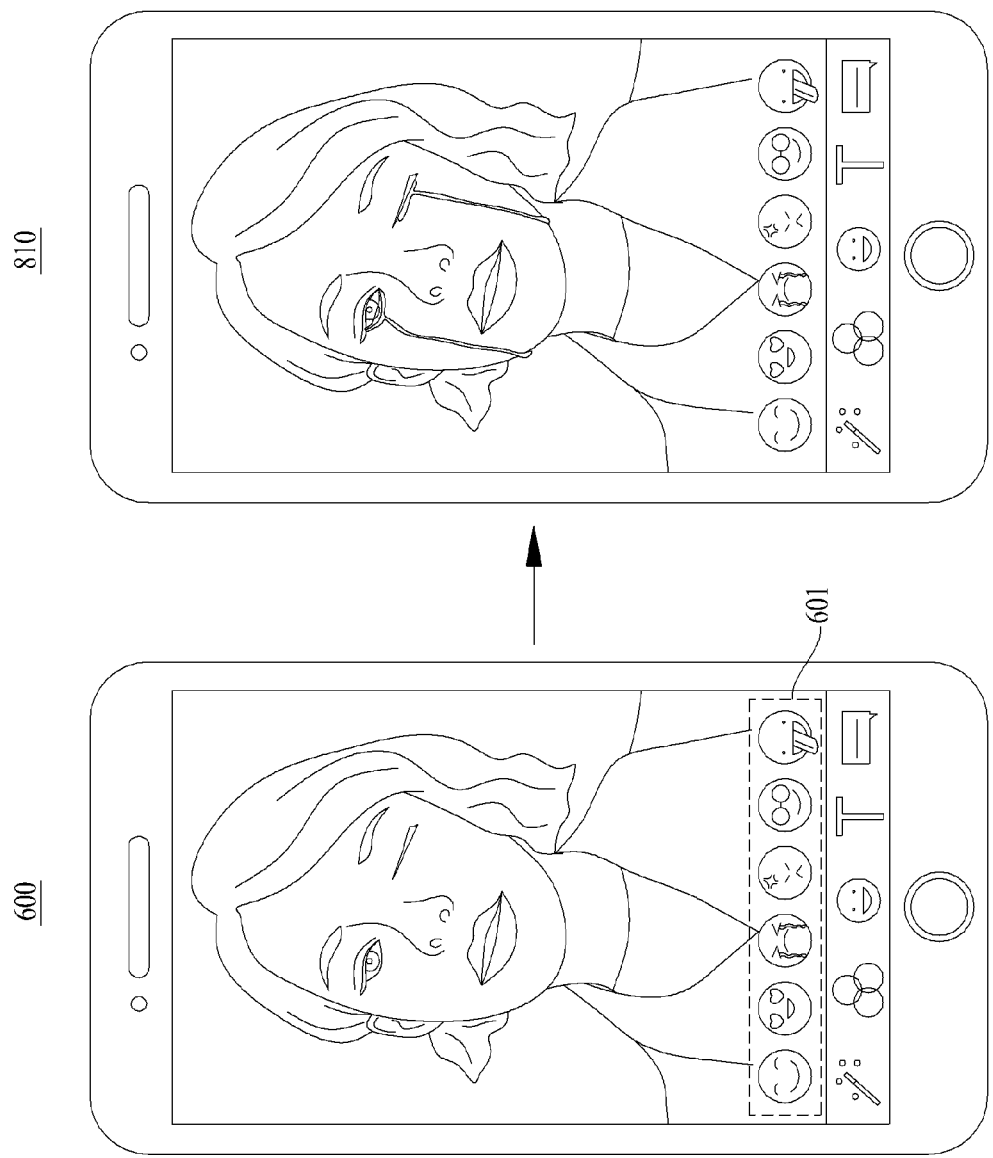

Referring to FIG. 8, in response to the user selecting the icon 'sorrow' from the emotion selection menu 601 on the camera image screen 600, a random effect may be selected from among effects corresponding to a group of 'sorrow' and immediately applied to the image from the camera. Accordingly, an effect suitable for the emotion 'sorrow', for example, an image 810 to which a tear effect is applied, may be provided as the live broadcast.

As described above, a random effect suitable to the context of the user may be selected by additionally using at least one piece of contextual information with an emotion selected by the user as the emotion selection criterion. Accordingly, an effect included in a group of the emotion selected by the user, and which is also further suitable to the actual context of the user, may be selected and may be provided as the live broadcast.

An effect selection target to be applied to the camera may vary based on a type of a user gesture applied on the emotion selection menu 601. For example, the user gesture on the emotion selection menu 601 may be classified into a single tap, a double tap, a long tap, etc. If the user gesture is the single tap, an effect randomly selected from a specific emotion group may be provided. If the user gesture is the double tap, a most recently used effect may be provided. If the user gesture is the long tap, an effect directly selected by the user from a list of effects recommended based on a recommendation criterion may be provided.

In response to the user single tapping the icon 'joy' on the emotion selection menu 601 displayed on the camera image screen 600, the effect randomly selected from the group of 'joy', for example, the image 710 of FIG. 7 to which the heart-shaped effect is applied may be provided as the live broadcast.

Figure 9:
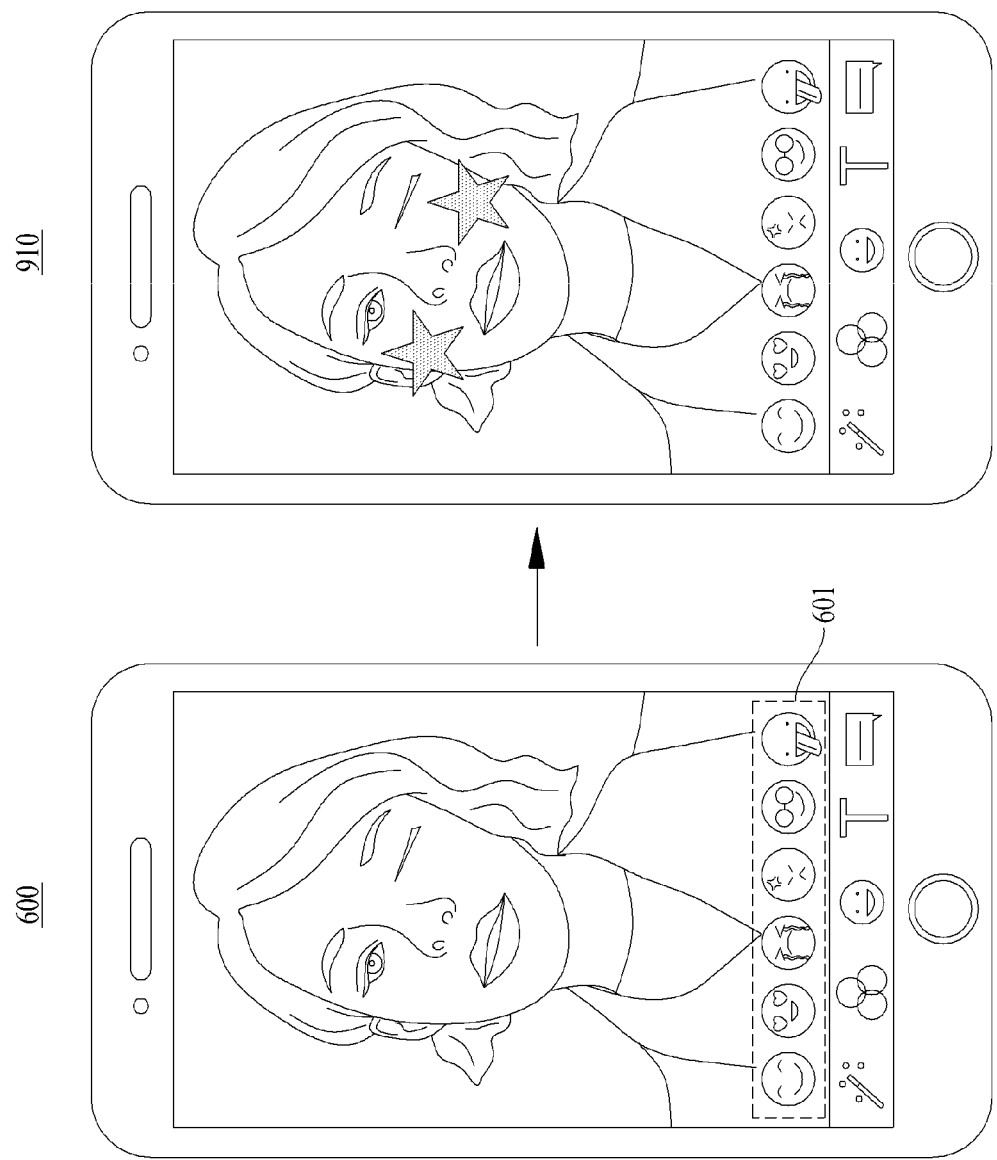

Referring to FIG. 9, a star-shaped effect is assumed, in this example, to be the effect most recently used in the group of 'joy'. Here, in response to the user double tapping the icon 'joy' on the emotion selection menu 601 displayed on the camera image screen 600, the star-shaped effect (which, in this example, was the most recently used effect in the corresponding emotion group) may be immediately applied to the camera and an image 910 to which the most recently used effect is applied among the effects included in the group of 'joy' may be provided as the live broadcast instead of using the random effect.

Referring to FIG. 10, in response to the user long tapping the icon 'joy' on the emotion selection menu 601 displayed on the camera image screen 600, a portion of effects that meet a predetermined (or, alternatively, desired) requirement in the group of 'joy' may be configured as a list 1011 of recommended effects and provided. For example, a recommended effect may be selected based on a criterion using user history information for effects. That is, an effect frequently used by the user may be recommended. The user may directly select an effect to be applied to the camera image from the list 1011 which includes frequently used effects in the group of 'joy'. An image 1010 to which an effect, for example, a lip-shaped effect, directly selected by the user, may be provided as the live broadcast instead of using the random effect.

According to some example embodiments, it is possible to quickly provide a camera effect without interrupting a broadcast during a live broadcast, and to provide a camera effect suitable for an emotion selected by a user or an emotion automatically recognized from an image during a live broadcast. Also, according to some example embodiments, since a camera effect suitable for an emotion selected by a user or an emotion automatically recognized from an image is provided through a user context-based weight modeling, it is possible to provide an effect capable of further maximally representing a corresponding emotion.

The systems and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An effect providing method of an electronic device configured as a computer, the method comprising:
   determining an emotion for a camera image of the electronic device as a criterion for selecting an effect to be applied to the camera image of the electronic device, wherein the determining comprises determining an emotion recognized from a facial expression of the camera image as an effect selection criterion;
   collecting contextual information associated with a user of the electronic device, wherein the collecting comprises collecting the contextual information including at least one of time information associated with the camera image, place information associated with the camera image, color information associated with the camera image, photo-shooting mode information associated with the camera image, feedback information associated with the camera image, and target information associated with the camera image; and
   immediately adding, to the camera image, an effect that is randomly selected from among effects representing the determined emotion,
   wherein the adding comprises randomly selecting the effect from among the effects corresponding to the determined emotion, the effect matching the contextual information.

2. The method of claim 1, wherein the selecting comprises applying a weight corresponding to the contextual information to each of the effects corresponding to the determined emotion and selecting the effect to be added to the camera image based on the weight.

3. The method of claim 1, wherein the selecting comprises selecting different contextual information based on the determined emotion and using the selected contextual information as the effect selection criterion.

4. The method of claim 1, wherein the selecting comprises applying a weight corresponding to the contextual information to each of the effects corresponding to the determined emotion and selecting the effect to be added to the camera image based on the weight, and
applying a different weight for each piece of the contextual information based on the determined emotion.

5. The method of claim 1, wherein the determining comprises:
providing an emotion selection menu including a plurality of emotion icons; and
determining an emotion selected through the emotion selection menu as an effect selection criterion.

6. The method of claim 5, wherein the adding comprises selecting a different effect selection target to be added to the camera image from among the effects corresponding to the determined emotion, based on a user gesture type for the emotion selection menu.

7. A non-transitory computer-readable recording medium storing instructions that, when executed by a processor, cause the processor to perform the effect providing method of claim 1.

8. An effect providing system of an electronic device configured as a computer, the effect providing system comprising:
one or more processors configured to execute computer-readable instructions,
wherein the one or more processors comprise:
an emotion determiner configured to determine an emotion for a camera image of the electronic device as a criterion for selecting an effect to be applied to the camera image of the electronic device, wherein the emotion determiner is configured to determine an emotion selected by a user of the electronic device or an emotion recognized from a facial expression of the camera image as an effect selection criterion;
a context collector configured to collect contextual information associated with a user of the electronic device, wherein the context collector is configured to collect the contextual information including at least one of time information associated with the camera image, place information associated with the camera image, color information associated with the camera image, photo-shooting mode information associated with the camera image, and target information associated with the camera image; and
an effect selector configured to immediately add, to the camera image, an effect that is randomly selected from among effects representing the determined emotion, wherein the effect selector is configured to randomly select the effect from among the effects corresponding to the determined emotion, the effect matching the contextual information.

9. The effect providing system of claim 8, wherein the effect selector is configured to apply a weight corresponding to the contextual information to each of the effects corresponding to the determined emotion and to select the effect to be added to the camera image based on the weight.

10. The effect providing system of claim 8, wherein the effect selector is configured to select different contextual information based on the determined emotion and to use the selected other contextual information as the effect selection criterion.

11. The effect providing system of claim 8, wherein the effect selector is configured to apply a weight corresponding to the contextual information to each of the effects corresponding to the determined emotion and to select the effect to be added to the camera image based on the weight, and to apply a different weight for each piece of the contextual information based on the determined emotion.

12. The effect providing system of claim 8, wherein the emotion determiner is configured to provide an emotion selection menu including a plurality of emotion icons, and to determine an emotion selected through the emotion selection menu as an effect selection criterion.

13. The effect providing system of claim 12, wherein the effect selector is configured to select a different effect selection target to be added to the camera image from among the effects corresponding to the determined emotion, based on a user gesture type for the emotion selection menu.

14. An effect providing method of an electronic device configured as a computer, the method comprising:
determining an emotion for a camera image of the electronic device as a criterion for selecting an effect to be applied to the camera image of the electronic device, wherein the determining comprises determining an emotion selected by a user of the electronic device as an effect selection criterion;
collecting contextual information associated with a user of the electronic device, wherein the collecting comprises collecting the contextual information including at least one of time information associated with the camera image, place information associated with the camera image, color information associated with the camera image, photo-shooting mode information associated with the camera image, feedback information associated with the camera image, and target information associated with the camera image; and
immediately adding, to the camera image, an effect that is randomly selected from among effects representing the determined emotion,
wherein the adding comprises randomly selecting the effect from among the effects corresponding to the determined emotion, the effect matching the contextual information.

15. The method of claim 14, wherein the selecting comprises applying weight corresponding to the contextual information to each of the effects corresponding to the determined emotion and selecting the effect to be added to the camera image based on the weight.

16. The method of claim 14, wherein the selecting comprises selecting different contextual information based on the determined emotion and using the selected contextual information as the effect selection criterion.

17. The method of claim 14, wherein the selecting comprises applying a weight corresponding to the contextual information to each of the effects corresponding to the determined emotion and selecting the effect to be added to the camera image based on the weight, and
applying a different weight for each piece of the contextual information based on the determined emotion.

18. The method of claim 14, wherein the determining comprises:
providing an emotion selection menu including a plurality of emotion icons; and determining an emotion selected through the emotion selection menu as an effect selection criterion.

19. The method of claim 18, wherein the adding comprises selecting a different effect selection target to be added to the camera image from among the effects corresponding to the determined emotion, based on a user gesture type for the emotion selection menu.

* * * * *